United States Patent [19]
Aley et al.

[11] Patent Number: 5,717,731
[45] Date of Patent: Feb. 10, 1998

[54] OUTAGE COVER FOR NUCLEAR REACTOR CONTAINMENT VESSEL

[75] Inventors: Carl L. Aley, Boothwyn; Craig D. Thompson, Media; Robert B. Henstenburg, Glenside, all of Pa.

[73] Assignee: Advanced Ratio Design Co., Inc., Chester, Pa.

[21] Appl. No.: 650,769

[22] Filed: May 20, 1996

[51] Int. Cl.⁶ .................................................. G21C 13/00
[52] U.S. Cl. ..................... 376/203; 49/68; 220/315; 376/293
[58] Field of Search .......................... 376/203, 204, 376/287, 293, 463; 220/315, 319, 324, 582; 49/68, 477.1; 138/89, 93

[56] References Cited

U.S. PATENT DOCUMENTS

| | | | |
|---|---|---|---|
| 2,926,012 | 2/1960 | Maher | 376/203 |
| 2,927,787 | 3/1960 | Maher | 376/203 |
| 3,920,512 | 11/1975 | Sutherland | 376/203 |
| 4,047,632 | 9/1977 | Schilling | 220/315 |
| 4,192,717 | 3/1980 | Gross | 220/315 |
| 4,349,991 | 9/1982 | Schwiers et al. | 220/315 |
| 4,376,352 | 3/1983 | Soininen et al. | 376/203 |
| 4,678,620 | 7/1987 | Marshall et al. | 376/203 |
| 4,823,976 | 4/1989 | White, III et al. | 220/315 |
| 5,221,019 | 6/1993 | Pechacek et al. | 220/315 |

*Primary Examiner*—Daniel D. Wasil
*Attorney, Agent, or Firm*—Howson and Howson

[57] ABSTRACT

A circular outage cover of light-weight composite material is normally situated in a standby position adjacent to the opening at the outer end of the equipment access tunnel of a nuclear reactor containment vessel. In case of an emergency during an outage, the outage cover can be quickly rolled into position and engaged with a transition ring provided as an extension of the tunnel by retractable retaining shoes on the retaining ring and an inflatable seal carried by the outage cover. The ability of the outage cover to be closed quickly makes it possible to keep the operational cover open throughout most of the outage, and reduces the overall outage time. Hydraulic, pneumatic and electrical services pass radially through the transition ring and do not interfere with closure of the outage cover. An auxiliary diaphragm cooperable with the transition ring is used for pressure testing of the outage cover.

23 Claims, 5 Drawing Sheets

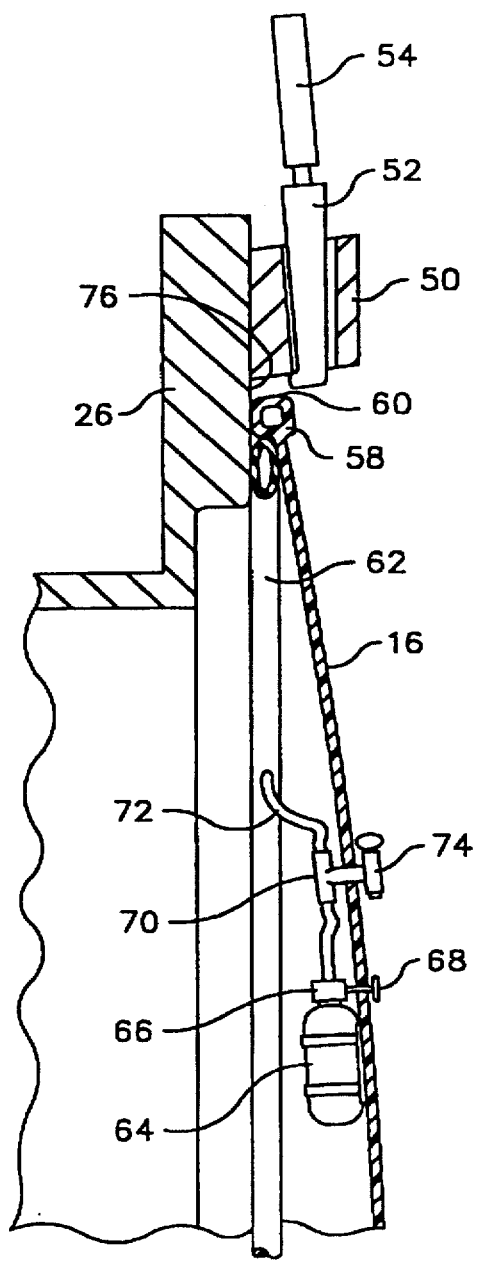
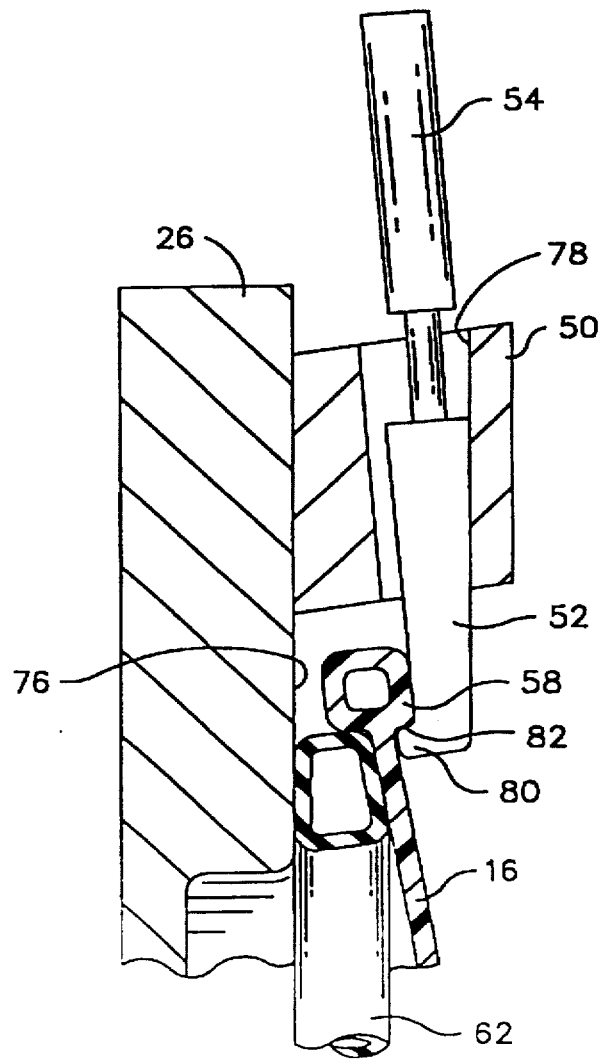
Fig. 3
Fig. 4

OUTAGE COVER FOR NUCLEAR REACTOR CONTAINMENT VESSEL

BRIEF SUMMARY OF THE INVENTION

This invention relates to nuclear reactor containment, and in particular to a novel apparatus allowing a rapid closure of the containment vessel in the case of an emergency during an outage.

The Nuclear Regulatory Commission requires nuclear plant reactors to go off-line at periodic intervals for the performance of certain safety and maintenance tasks. The period during which the reactor is shut down is called an "outage" and typically lasts for fifty five to sixty five days. Every day of lost operation has a very significant cost to the utility.

During an outage, even though the reactor is off-line, nuclear fuel is present and emergencies are possible. Although an emergency occurring while a reactor is off-line would not ordinarily be of the same magnitude as that of an emergency occurring when the reactor is on-line, nonetheless precautions must be taken, including keeping the equipment access door closed most of the time.

The equipment access door of a nuclear reactor containment vessel is installed at the inner end of the access tunnel, and is usually a large steel door having a circular periphery and a convex, spherical surface facing the interior of the containment vessel. The fact that the door is convex and located at the inner end of the tunnel enables it to withstand a high pressure. Typically, the door is designed to withstand a pressure of fifty-five pounds per square inch, plus appropriate safety factors.

It typically takes in excess of one hour to secure the door. Therefore, for safety, the door is required to be kept closed during much of the outage. Because of this requirement, access to the reactor by personnel and equipment is severely restricted. The lack of direct and convenient access to the interior of the containment vessel caused by the secured equipment access door hinders and delays maintenance operations, especially in the early part of the outage.

The principal object of this invention is to reduce substantially the duration of an outage, and thereby reduce the loss of revenue experienced by the utility as a result of the outage.

It is also an object of the invention to provide a simple, reliable and easily operated, outage-specific access cover.

In accordance with the invention, the cover, referred to as an "outage cover," is located at the outer end of the equipment access tunnel of the containment vessel, and is designed so that it can be rapidly closed in case of an emergency. Because the outage cover can be closed rapidly, both it and the equipment access door can be kept open throughout the duration of the outage, except during the first two days. This allows ready access for large equipment to the interior of the containment vessel during most of the outage, and can considerably reduce the duration of the outage.

In a preferred embodiment of the invention, a nuclear reactor containment vessel, having a conventional access passage with an operational closure at its inner end, is provided with a second closure for closing off the outer end of the access passage. The second closure comprises a door, located outside the containment vessel, and having inner and outer surfaces and a rim, and a transition ring fixed to the containment vessel wall. The transition ring surrounds the second end opening and has a face congruent with the rim of the door whereby the door can be moved into position to close off the outer end opening of the access passage with the inner surface of the door facing the interior of the containment vessel. A seal, preferably an inflatable toroid fixed the inner surface of the door, is provided for engaging both the inner surface of the door and the transition ring to seal the door to the access passage. Retaining shoes, connected to the transition means and removably engageable with the outer surface of the door, are provided for retaining the door in engagement with the seal to withstand internal pressure within the containment vessel. This structure allows the access passage to be sealed quickly by the door during outages.

The rim of the door is preferably circular, and the door rolls on a guide from a position clear of the access passage, to a position in which it is directly in front of the access passage. The guide is continuously inclined downward in the direction of the path of the door as it rolls toward the access passage, so that closure of the door is aided by gravity. Preferably, the door is composed of a fiber-reinforced resin so that it is light in weight and easily handled despite its large diameter, but sufficiently strong to withstand the pressures likely to be encountered in an emergency occurring during an outage.

So that the door can clear the retaining shoes as it is rolled toward its closed position, the point of contact of the rim of the door with the guide is confined to a path that approaches the face of the transition ring obliquely, and an upper guide supports the door so that it leans away from the transition ring. When the door is directly in front of the access passage, it can be pushed into engagement with the transition ring, locked in place by activation of the retention shoes, and sealed by inflation of the toroidal seal.

Because the sealing ring is affixed to the door, it is out of the way when the door is rolled to its standby position. This avoids exposure of the sealing ring to possible damage from contact with equipment being moved into and out of the containment vessel through the access passage. Preferably, a source of compressed gas is carried by said door, for inflating the sealing ring.

The transition ring is composed of steel and comprises a tubular, preferably cylindrical, portion extending outwardly from the outer face of the wall of the containment vessel and forming an extension of the access passage. Hydraulic, pneumatic or electrical service line can be connected from the exterior of the containment vessel to its interior through this tubular portion, and are clear of the door throughout the extent of movement of the door.

In a preferred embodiment, means are provided for disabling retraction of the retention shoes when the toroidal seal is inflated.

Still another object of the invention is to provide a novel means for testing the integrity of the outage cover and its seal. This is achieved by providing a stepped transition ring with a diaphragm positionable behind the outage cover to provide a relatively small enclosed volume behind the outage cover which can be pressurized.

Various other objects and advantages of the invention will be apparent from the following detailed description, when read in conjunction with the drawings.

BRIEF DESCRIPTION OF THE DRAWINGS

FIG. 3 is a fragmentary sectional view showing a cover retention shoe in its retracted position, and showing the inflatable toroidal seal in its relaxed condition;

FIG. 4 is a fragmentary sectional view, similar to FIG. 3, but showing the cover retention shoe in its extended position, and the toroidal seal inflated and pressing the outage cover against the shoe;

DETAILED DESCRIPTION

Figure 1:
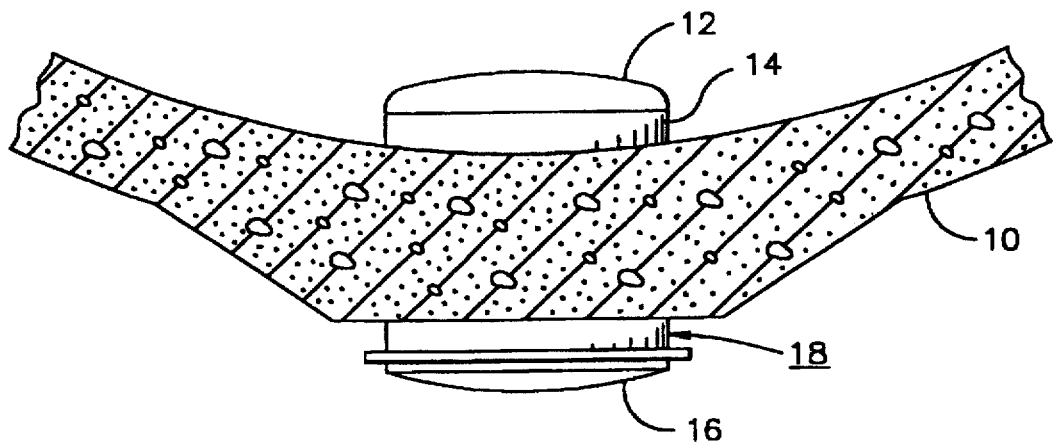
FIG. 1 is a simplified schematic view of a portion of a containment vessel, showing the equipment access tunnel, the operational closure at the inner end of the tunnel and the outage cover in accordance with the invention at the outer end of the tunnel.

Referring to FIG. 1, the wall 10 of a nuclear reactor containment vessel is ordinarily composed of steel-reinforced concrete and is typically circular in plan view, with a diameter of at least 100 feet. Its wall thickness ranges from about 4 feet, to about 8 feet at the location of the equipment access tunnel. The operational closure 12 is typically a steel door mounted on a steel extension 14 of the access tunnel. The door is convex toward the interior of the containment vessel. The door is designed to withstand a pressure in the containment vessel of 55 pounds per square inch, plus NRC-required safety factors, and is consequently very heavy. Securing the operational cover ordinarily takes in excess of one hour, and requires multiple personnel and the availability of an overhead lifting crane.

The outage cover of this invention comprises a door 16 mounted on a transition ring 18 at the outer end of the access tunnel. The transition ring is fixed to the access tunnel by welds 19.

Figure 2:
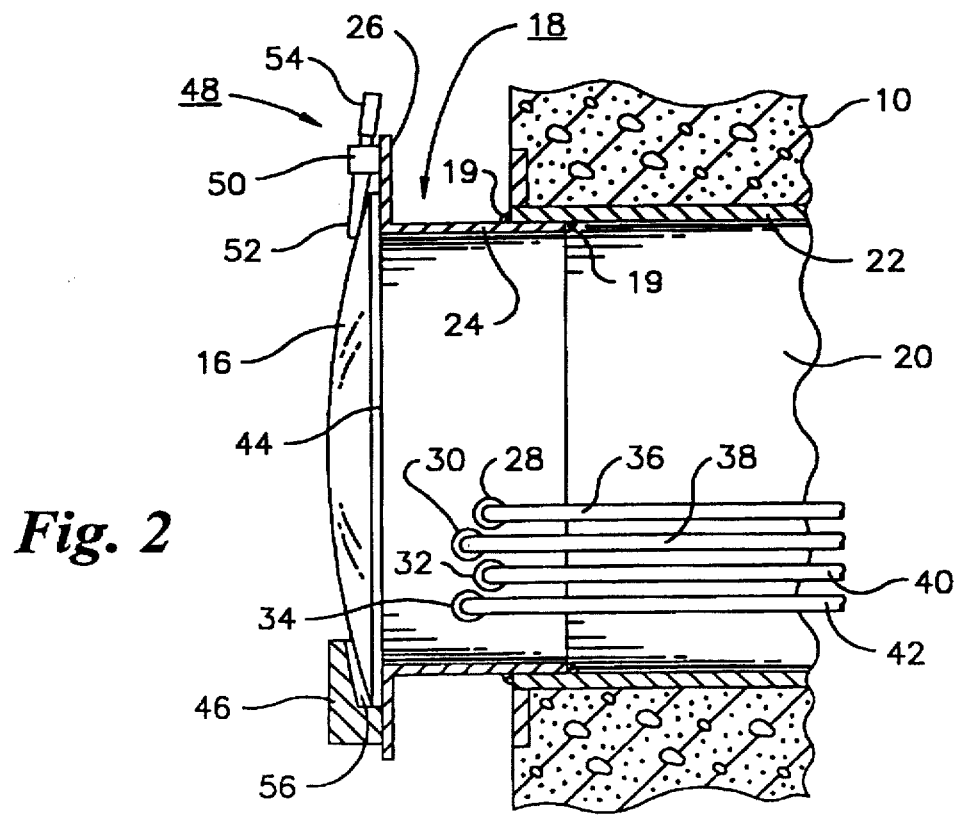
FIG. 2 is a fragmentary axial section showing the outage cover secured to a transition ring at the outer end of the access tunnel.

As shown in FIG. 2, the access tunnel 20 is conventionally lined with a steel sleeve 22. The transition ring 18 comprises a tubular, cylindrical portion 24, which is welded to sleeve 22, and a flange or face-plate 26, which is spaced forward of the outer face of the containment wall 10, preferably by at least about eight inches. The tubular portion 24 of the transition ring has passages for electrical, pneumatic and hydraulic services with fittings 28–34, which extend radially through the ring and connect with lines 36–42, which extend axially through access tunnel 20. Optionally, a static load support, in the form of a collar or collars (not shown), can be provided underneath the tubular portion of the transition ring.

The door 16 is circular in shape and its rim 44 is congruent with the front face of flange 26 of the transition ring, so that it is able to close off the outer end of the tunnel 20. The door 16 rolls on a guide 46, and is locked into place by a plurality of pneumatically or hydraulically actuated retention shoe assemblies positioned on the flange 26. One such retention shoe assembly 48 comprises a housing 50 supporting a shoe 52, which is extensible and retractable by a pneumatic actuator 54. The shoe engages the outer surface of the door 16. In a typical installation seven or more such retractable retention shoes will be provided at circumferentially spaced locations on the flange 26 of the transition ring. An inflatable seal, to be described below, urges the door 16 outwardly against the shoes. Surface 56 of the guide 46 also engages the outer surface of the door when the inflatable seal is activated. While the shoes are preferably operated by pneumatic or hydraulic actuators, provisions such as control cables, linkage or gearing, (not shown) may be made for a manual override, so that the retention shoes can extended manually for engagement with the door in case of failure of hydraulic or pneumatic pressure.

The door 16, the upper part of which is shown in section in FIG. 3, is preferably a high-strength composite, for example a composite consisting of glass, carbon or aramid fibers in a thermosetting epoxy or vinyl matrix. The door is preferably a laminate in which the reinforcing filaments of any given ply run in the same direction, but adjoining plies are at an optimum bias to each other so that there is no natural path for a failure to propagate.

The periphery of the door is circular. The door has a convex outer surface and a concave inner surface, and for the most part it has a uniform thickness. However it has an enlarged rim 58, with an outer surface 60 which engages a surface on which the door rolls. The rim not only provides a rolling surface, but also reinforces the door and provides resistance to bending and compression when the inner surface of the door is subjected to pressure.

An inflatable, toroidal tube 62 is adhesively bonded to the inner face of the door 16, adjacent to the rim 58. This toroidal tube is inflatable by a gas, e.g. $CO_2$, supplied from a cylinder 64, also mounted on the inside face of the door. The flow of gas from the cylinder to the tube 62 is controlled by a valve 66, having a control 68 accessible from the outside of the door. A T-connection 70 in the gas line 72, extending from valve 66 to tube 62, allows gas to flow through an externally mounted valve 74, through which gas can be vented. Valve 74 can also be connected to an auxiliary gas source, e.g. a manually or motor-operated pump for inflation of tube 62 in the event of failure of gas source 64.

As shown in FIG. 3, retention shoe 52 is in its retracted position, tube 62 is relaxed, and rim 58 is in engagement with vertical face 76 of flange 26.

As shown if FIG. 4, if the shoe 52 is extended by actuator 54 inwardly past the rim 58 of the door, and the toroidal sealing tube 62 is inflated, the door will be pushed outward against the retention shoe, which, when extended is in engagement with wall 78 inside retention shoe housing 50. The tube 62 will form an annular seal in the space between the door and flange face 76. An inflation pressure of 12 psi will withstand the pressures likely to be encountered in an emergency during an outage.

In the preferred embodiment of the invention, the tip of the retention shoe is shaped with an inwardly projecting toe 80, which engages a shoulder 82, formed on the outer surface of the door at a location radially inward from the rim. The engagement of toe 80 with shoulder 82 prevents the retention shoe from being retracted when the toroidal seal is inflated.

Figure 5:
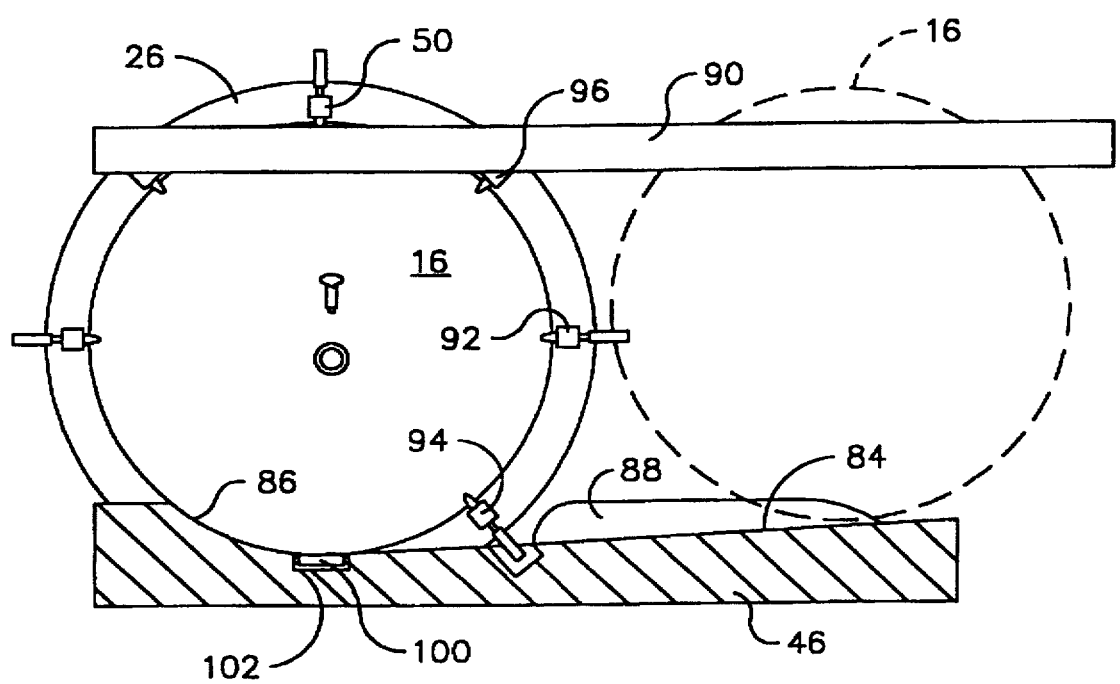
FIG. 5 is a front elevational view, partly in section, showing the outage cover in its standby and closed positions, and also showing a cover guide ramp and an upper cover guide.

Referring to FIG. 5, the surface 84 of guide 46, on which the door rolls, is inclined downward so that the closing of the door is assisted by gravity. The door will ordinarily be held in its standby position (depicted by the broken lines in FIG. 5) by a chock or other retaining device (not shown). A protective closure (not shown) may be provided to house the door in its standby position.

When the door is released, it rolls down inclined surface 84 toward its position in front of the access opening, where it is stopped by a ramp 86 conforming to the curvature of the periphery of the door. The guide 46 is provided with a rear wall 88, which is engageable by the rim of the door, and surface 56 of a front wall of guide 46 (see FIG. 2) engages the outer surface of the door. An upper guide 90, extending from the standby position of the door to a location in front of the access tunnel, supports the door by engaging its outer surface.

Figures 6, 7:
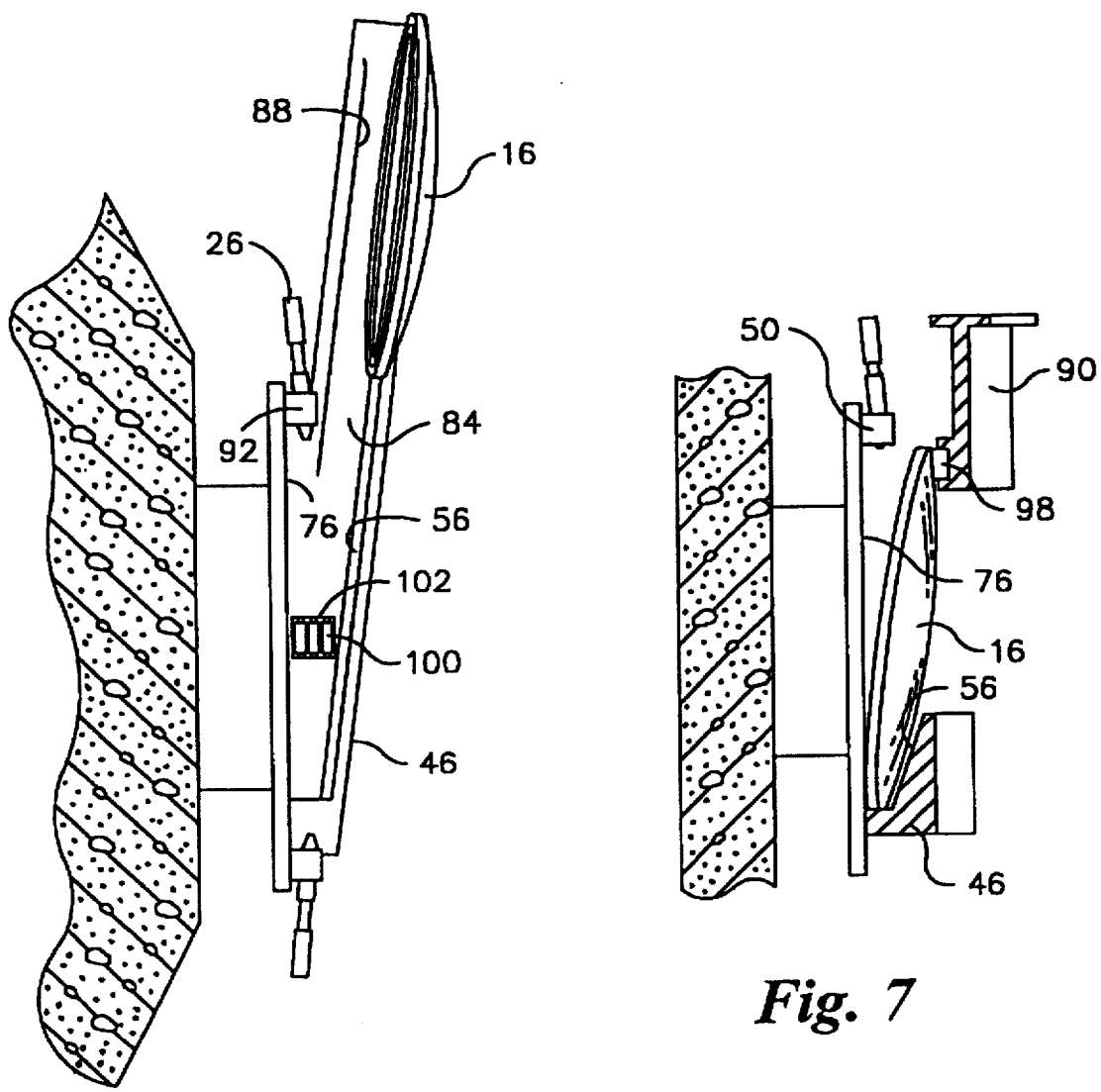
FIG. 6 is a top elevational view, partly in section, showing the outage cover in its standby position, and showing the angular relationship between the guide ramp and the face of the transition ring.
FIG. 7 is a side elevational view, partly in section, showing the outage cover positioned adjacent to the transition ring, but tilted outward to clear the retention shoes as it approaches the ring.

As will be apparent from FIG. 5, if the door is to be rolled into position, measures need to be taken to prevent the retention shoe assemblies from interfering with the movement of the door. Accordingly, as shown in FIGS. 6 and 7, the upper and lower guides 90 and 46 are arranged so that the door approaches the transition ring obliquely in plan view, and leans outward in elevational view. By constraining the door in this manner, it is possible to avoid collision between the door and the retention shoe assemblies.

FIG. 6 shows the door in its standby position, and shows that wall 56 approaches the face 75 of the flange 26 obliquely. As the door moves down inclined surface 84, it clears retention shoe assembly 92 (FIG. 6) as well as similar assemblies 94 and 96 (FIG. 5), and comes to rest in engagement with curved ramp 86. As seen in FIG. 7, the door leans outward against roller bearings 98 mounted on upper guide 90. Guide 90 approaches the face of the transition ring obliquely in the same manner as does guide 46. The fact that the door leans outward insures that the door will not accidentally fall toward the transition ring and come into contact with the upper retention shoe assembly 96 on the approach side of the transition ring.

In its position in engagement with ramp 86, the door still leans outward as depicted in FIG. 7. However, it is so near vertical that it can be easily pushed manually into engagement with face 76 of the transition ring, i.e. into the position depicted in FIG. 3. Roller bearings 100 (FIGS. 5 and 6) in a recess 102 in the floor of the lower guide 46, assist in moving the door into its closed position. When the door is engaged with the face 76 of the transition ring, the retention shoes can be extended and the seal inflated to push the door outward against the shoes (as shown in FIG. 4). When the seal is inflated, the door engages all of the retention shoes, and the lower left hand part of the door as seen in FIG. 5, also engages a part of wall 56 of the lower guide 46, which serves the same purpose as a retention shoe. Thus, it is not necessary to provide a retention shoe assembly on the lower left quadrant of the transition ring (as viewed in FIG. 5).

Figure 8:
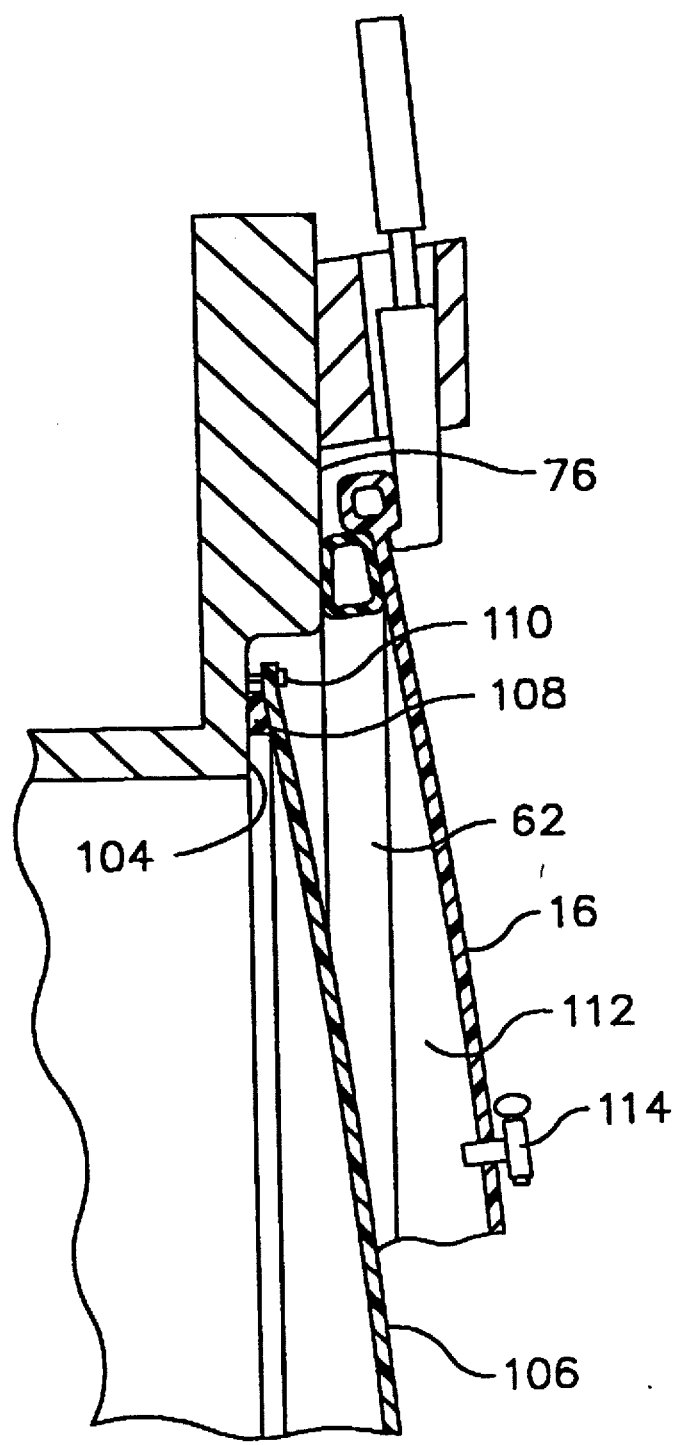
FIG. 8 is a side elevational view, partly in section, showing the outage cover and transition ring, and also showing the pressure test diaphragm.

FIG. 8, which shows the door 16 in sealed relation to the face 76 of the transition ring, also shows a stepped back surface 104 of the transition ring on which is mounted a diaphragm 106, the outwardly facing surface of which is convex. The diaphragm is preferably formed of a composite material similar to that of the outage cover. The diaphragm is provided with a resilient seal 108, which engages surface 104, so that the diaphragm closes off the access tunnel. The diaphragm is initially secured in place by a number of fasteners, one of which is shown at 110. The diaphragm and the door cooperate to enclose a small volume 112 between them, that can be pressurized through a valve 114 in the door, to test the integrity of the door and its seal. The diaphragm makes it possible to test the integrity of the outage cover without closing the operational cover, and, because the volume 110 is much smaller than that of the access passage, it is possible to carry out the test quickly and easily.

From the above description, it will be apparent that, by providing an outage cover at the outer end of the access tunnel, it is possible to seal the containment vessel within a very short time, e.g. as little as five minutes, in the case of an emergency during an outage. With an outage cover available for immediate closure, it is no longer necessary to keep the operational cover closed during much of the outage; in fact, with the outage cover of the invention, the access tunnel will normally be open during the entire outage, after the second day, eliminating delays caused by the necessity of waiting until much later in the outage cycle when the operational equipment access door is presently permitted by regulatory authority to be opened. With an outage cover according to this invention available, it is estimated that the duration of an outage can be reduced by as much as five days.

Various departures can be taken from the outage cover arrangement specifically described. For example, while a composite door is preferred because of its strength and light weight, it is possible to use a metal door. It is also possible to realize many of the advantages of this invention using a hinged outage cover instead of an outage cover which rolls into place.

Possible modifications include the use of different numbers and arrangements of retention shoes, as well as different retention shoe assemblies and structures. Another possible modification is to eliminate the toes on the retention shoes and the cooperating shoulder on the door, and instead utilize a control which senses pressure in the inflatable seal, and disables the mechanism for retracting the retention shoes. While, in the case of a rolling door, it is desirable both to lean the door outward and guide the door obliquely toward the transition ring, it is possible to clear the retention shoe assemblies by either of these measures without the other. In still another modification, the retention shoe assemblies can be made axially retractable so that the door can be rolled in a plane parallel to the face of the transition ring. Another possible modification is the provision of one or more expansible sealing rings as auxiliary seals between the inner surface of the door and the face of the transition ring flange to supplement the inflatable seal. Optionally, the final movement of the door to its closed position against the flange of the transition ring can be power-assisted, by an actuator located on the upper guide 90.

These and various other modifications which will occur to persons skilled in the art after having read the foregoing description, can be made to the specific apparatus described, without departing from the scope of the invention, which is defined in the following claims.

We claim:

1. In a nuclear reactor containment vessel having an interior space enclosed by a wall having inner and outer faces, an access passage extending through the wall and having an first end opening adjacent to the inner face of the wall and a second end opening adjacent to the outer face of the wall, an operational closure means, located within the interior space of the containment vessel, for closing off the first end opening of the access passage, means providing an outwardly facing surface fixed to the access passage and located adjacent to the second end opening of the access passage, said surface surrounding the second end opening of the access passage and facing away from the interior of the containment vessel, outage cover means, located outside the containment vessel and outside the access passage, means, engageable with said outage cover means and with said surface surrounding the second end opening of the access passage, for providing a seal between the outage cover means and said surface surrounding the second end opening of the access passage, and means, engageable with the outage cover means, for retaining the outage cover means, the seal-providing means and said outwardly facing surface surrounding the second end opening of the access passage in sealing relationship, whereby the outage cover means can close off the second end opening of the access passage.

2. A nuclear reactor containment vessel according to claim 1 including transition means connected to the access passage adjacent to the second end opening, wherein said outwardly facing surface surrounding the second end opening is a surface of said transition means.

3. A nuclear reactor containment vessel according to claim 1 in which said means for providing a seal is an inflatable toroidal seal, which, when inflated, pushes the outage cover away from said surface surrounding the second end opening of the access passage and into engagement with the retaining means.

4. A nuclear reactor containment vessel according to claim 3 in which said means for providing a seal is fixed to, and carried by, the cover means.

5. In a nuclear reactor containment vessel having an interior space defined by a wall with inner and outer faces, an access passage extending through the wall and having a first end opening adjacent to the inner face of the wall and a second end opening adjacent to the outer face of the wall, operational closure means, located within the interior of the containment vessel, for closing off the first end opening of the access passage, second closure means for closing off the second end opening of the access passage, the second closure means comprising a door located outside the containment vessel and outside the access passage, the door having inner and outer surfaces and a rim, transition means fixed to the access passage, the transition means surrounding the second end opening and having a surface facing away from the interior of the containment vessel and congruent with the rim of the door whereby the door can be moved into position to close off said second end opening of the access passage with its inner surface facing the interior of the containment vessel, sealing means for engaging both the inner surface of the door and said surface of the transition means to seal the door to the access passage, and means, connected to the transition means and removably engageable with the outer surface of the door, for retaining the door, the sealing means and the transition means in sealing relationship to withstand internal pressure within the containment vessel, whereby the access passage can be sealed by the door during outages.

6. A nuclear reactor containment vessel having an interior space defined by a wall with inner and outer faces, an access passage extending through the wall and having a first end opening adjacent to the inner face of the wall and a second end opening adjacent to the outer face of the wall, operational closure means, located within the interior of the containment vessel, for closing off the first end opening of the access passage, second closure means for closing off the second end opening of the access passage, the second closure means comprising a door located outside the containment vessel, the door having inner and outer surfaces and a rim, transition means fixed to the access passage, the transition means surrounding the second end opening and having a face congruent with the rim of the door whereby the door can be moved into position to close off said second end opening of the access passage with its inner surface facing the interior of the containment vessel, sealing means for engaging both the inner surface of the door and the transition means to seal the door to the access passage, and means, connected to the transition means and removably engageable with the outer surface of the door, for retaining the door, the sealing means and the transition means in sealing relationship to withstand internal pressure within the containment vessel, whereby the access passage can be sealed by the door during outages, in which the rim of the door is circular, and including lower guide means, extending from a location underneath a point directly in front of said second end opening, at least to a location spaced laterally from the access passage, said guide means providing a surface on which the circular rim of the door can roll from a position in which it is in contact with the lower guide means at said location spaced laterally from the access passage and clear of the said second end opening, to a position in which it is directly in front of said second end opening.

7. A nuclear reactor containment vessel according to claim 6 in which said surface of the lower guide means is continuously inclined downward in the direction of the path of the door as it rolls on said surface of the lower guide means, from said location spaced laterally from the access passage to said location underneath a point directly in front of said second end opening.

8. A nuclear reactor containment vessel according to claim 6 in which said lower guide means includes means for confining the point of contact of the rim with said surface of the lower guide means to a path that approaches the face of the transition means obliquely.

9. A nuclear reactor containment vessel according to claim 6 including upper guide means for engaging and supporting the outer surface of the door, the upper and lower guide means being related to each other so that the door leans away from the transition means as the door approaches said position directly in front of said second end opening.

10. A nuclear reactor containment vessel according to claim 6 in which said means for retaining the door comprises at least one retractable retention shoe positioned on said transition means, and in which said lower guide means includes means for confining the point of contact of the rim with said surface of the lower guide means to a path that approaches the face of the transition means obliquely.

11. A nuclear reactor containment vessel according to claim 10 in which said lower guide means includes fixed means for engaging a portion of the outer surface of the door when the door is sealed to the access passage.

12. A nuclear reactor containment vessel according to claim 6 including roller means on said lower guide means for supporting the door as the door is moved from its position directly in front of said second end opening toward the transition means.

13. A nuclear reactor containment vessel according to claim 6 in which said means for retaining the door comprises at least one retractable retention shoe positioned on said transition means, and including upper guide means for engaging and supporting the outer surface of the door, the upper and lower guide means being related to each other so that the door leans away from the transition means as the door approaches said position directly in front of said second end opening whereby the door clears said retention shoe as it approaches the face of the transition means.

14. A nuclear reactor containment vessel according to claim 6 in which said face of the transition means is annular in shape, and said means for retaining the door comprises at least two retractable retention shoes at circumferentially spaced positions on said annular face of the transition means, in which said lower guide means includes means for confining the point of contact of the rim with said surface of the lower guide means to a path that approaches the face of the transition means obliquely, and including upper guide means for engaging and supporting the outer surface of the door, the upper and lower guide means being related to each other so that the door leans away from the transition means as the door approaches said position directly in front of said second end opening, whereby the door clears said retention shoes as it approaches the face of the transition means.

15. A nuclear reactor containment vessel according to claim 6 in which said face of the transition means is annular in shape, and said means for retaining the door comprises at least two retractable retention shoes at circumferentially spaced positions on said annular face of the transition means, in which said lower guide means includes means for confining the point of contact of the rim with said surface of the lower guide means to a path that approaches the face of the transition means obliquely, and including upper guide means for engaging and supporting the outer surface of the door, the upper and lower guide means being related to each other so that, as the circular rim of the door rolls from the position in which it is in contact with the lower guide means at said location spaced laterally from the access passage and clear of the said second end opening, to a position in which it is directly in front of said second end opening, the circular rim of the door is situated in a plane which is oblique both with respect to an imaginary horizontal plane, and with respect to an imaginary vertical plane parallel to the face of the transition means, whereby the door clears said retention shoes as it approaches the face of the transition means.

16. A nuclear reactor containment vessel having an interior space defined by a wall with inner and outer faces, an access passage extending through the wall and having a first end opening adjacent to the inner face of the wall and a second end opening adjacent to the outer face of the wall, operational closure means, located within the interior of the containment vessel, for closing off the first end opening of the access passage, second closure means for closing off the second end opening of the access passage, the second closure means comprising a door located outside the containment vessel, the door having inner and outer surfaces and a rim, transition means fixed to the access passage, the transition means surrounding the second end opening and having a face congruent with the rim of the door whereby the door can be moved into position to close off said second end opening of the access passage with its inner surface facing the interior of the containment vessel, sealing means for engaging both the inner surface of the door and the transition means to seal the door to the access passage, and retaining means, connected to the transition means and removably engageable with the outer surface of the door, for retaining the door, the sealing means and the transition means in sealing relationship to withstand internal pressure within the containment vessel, whereby the access passage can be sealed by the door during outages, in which the sealing means is an inflatable toroidal sealing ring, which, when inflated, pushes the door away from the face of the transition means and into engagement with the retaining means.

17. A nuclear reactor containment vessel according to claim 16 in which the sealing ring is located on the inner surface of the door and carried by the door.

18. A nuclear reactor containment vessel according to claim 17 including means, comprising an inflation gas reservoir, carried by said door, for inflating the sealing ring.

19. A nuclear reactor containment vessel according to claim 5 in which substantially the entire door is composed of a fiber-reinforced resin.

20. A nuclear reactor containment vessel having an interior space defined by a wall with inner and outer faces, an access passage extending through the wall and having a first end opening adjacent to the inner face of the wall and a second end opening adjacent to the outer face of the wall, operational closure means, located within the interior of the containment vessel, for closing off the first end opening of the access passage, second closure means for closing off the second end opening of the access passage, the second closure means comprising a door located outside the containment vessel, the door having inner and outer surfaces and a rim, transition means fixed to the access passage, the transition means surrounding the second end opening and having a face congruent with the rim of the door whereby the door can be moved into position to close off said second end opening of the access passage with its inner surface facing the interior of the containment vessel, sealing means for engaging both the inner surface of the door and the transition means to seal the door to the access passage, and means, connected to the transition means and removably engageable with the outer surface of the door, for retaining the door, the sealing means and the transition means in sealing relationship to withstand internal pressure within the containment vessel, whereby the access passage can be sealed by the door during outages, in which the transition means comprises a tubular portion extending outwardly from the outer face of the wall and forming an extension of the access passage, and connecting means, comprising at least one passage extending laterally through the tubular portion, for connection of at least one service, from the group consisting of electrical, hydraulic and pneumatic services, from the exterior of the containment vessel to the interior thereof, said connection means being clear of the door throughout the extent of movement of the door.

21. A nuclear reactor containment vessel having an interior space defined by a wall with inner and outer faces, an access passage extending through the wall and having a first end opening adjacent to the inner face of the wall and a second end opening adjacent to the outer face of the wall, operational closure means, located within the interior of the containment vessel, for closing off the first end opening of the access passage, second closure means for closing off the second end opening of the access passage, the second closure means comprising a door located outside the containment vessel, the door having inner and outer surfaces and a rim, transition means fixed to the access passage, the transition means surrounding the second end opening and having a face congruent with the rim of the door whereby the door can be moved into position to close off said second end opening of the access passage with its inner surface facing the interior of the containment vessel, sealing means for engaging both the inner surface of the door and the transition means to seal the door to the access passage, and means, connected to the transition means and removably engageable with the outer surface of the door, for retaining the door, the sealing means and the transition means in sealing relationship to withstand internal pressure within the containment vessel, whereby the access passage can be sealed by the door during outages, in which the transition means comprises a cylindrical portion forming a part of the access passage and a flange, in which said face of the transition means is a face of the flange, and connecting means, comprising at least one passage extending laterally through the cylindrical portion, for connection of at least one service, from the group consisting of electrical, hydraulic and pneumatic services, from the exterior of the containment vessel to the interior thereof, said connection means being clear of the door throughout the extent of movement of the door.

22. A nuclear reactor containment vessel according to claim 5 in which the means for retaining the door comprises a plurality of retractable shoes engageable with the outer surface of the door, in which the sealing means is an inflatable toroidal tube, and including means for disabling retraction of the retractable shoes when the toroidal tube is inflated.

23. In a nuclear reactor containment vessel having an interior space defined by a wall with inner and outer faces, an access passage extending through the wall and having an first end opening adjacent to the inner face of the wall and a second end opening adjacent to the outer face of the wall, and operational closure means, located within the interior of the containment vessel, for closing off the first end opening of the access passage, second closure means for closing off the second end opening of the access passage, the second closure means comprising a door located outside the containment vessel, the door having inner and outer surfaces and a rim, transition means fixed to the access passage, the transition means surrounding the second end opening and having a face congruent with the rim of the door whereby the door can be moved into position to close off said second end opening of the access passage with its inner surface facing the interior of the containment vessel, sealing means for engaging both the inner surface of the door and the transition means to seal the door to the access passage, and means, connected to the transition means and removably engageable with the outer surface of the door, for retaining the door, the sealing means and the transition means in sealing relationship to withstand internal pressure within the containment vessel, whereby the access passage can be sealed by the door during outages, said transition means having an auxiliary surface facing the inner surface of the door, and means comprising a diaphragm having a periphery sealed to said auxiliary surface for closing off said access passage and cooperating with the door and the sealing means to provide an enclosed volume adjacent to the inner face of the door which is small in comparison to the volume of the access passage, whereby the integrity of the door and the sealing means can be tested by pressurizing said enclosed volume.

* * * * *